A. BODART.
Pipe Joint and Coupling.
No. 210,906. Patented Dec. 17, 1878.
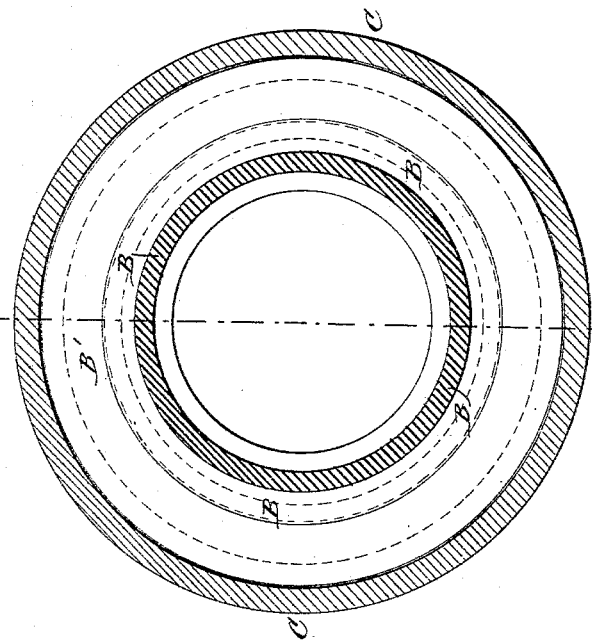
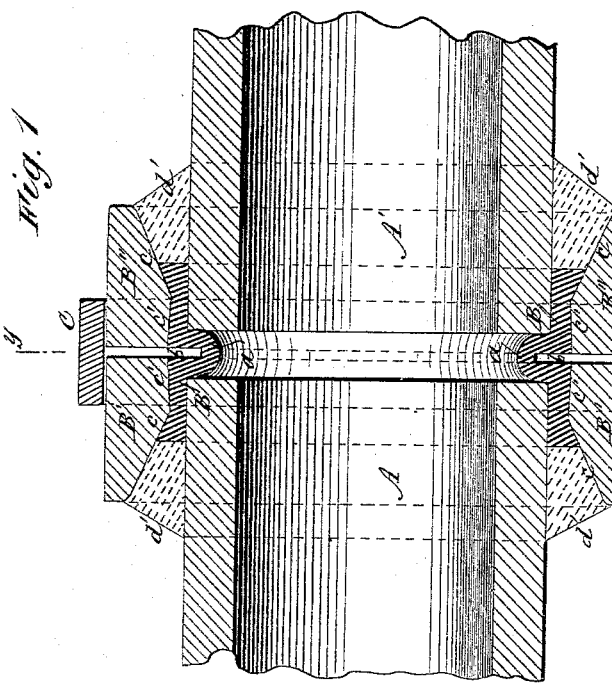
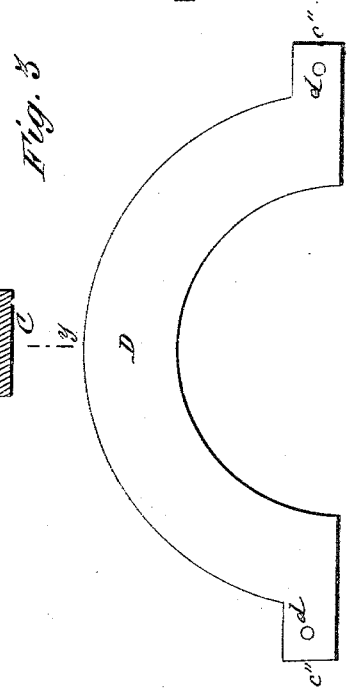
WITNESSES:
C. Neveux
C. Sedgwick
INVENTOR:
A. Bodart
BY Munn & Co.
ATTORNEYS.

UNITED STATES PATENT OFFICE.

ALPHONSE BODART, OF HUY, BELGIUM.

IMPROVEMENT IN PIPE JOINTS AND COUPLINGS.

Specification forming part of Letters Patent No. 210,906, dated December 17, 1878; application filed November 21, 1878.

*To all whom it may concern:*

Be it known that I, ALPHONSE BODART, of Huy, in the Province of Liege and Kingdom of Belgium, have invented a new and useful Improvement in Joints and Couplings for Pipes, of which the following is a specification:

The object of this invention is to furnish a strong and close union of pipes for gas and water supply, and for other purposes, without the use of sockets or flanges on the pipes, and that will allow for the expansion and contraction thereof.

It consists in packing the joint with a leaden ring or annulus having an inner circumferential bead interposed between the two adjacent ends of the pipes, and securely packed and held in position by two external rings having an internal contour that permits the leaden ring to be wedged between it and the pipe, and securing the whole together by a hoop encircling the two iron rings, and a filling of cement on each side of the coupling.

In the accompanying drawing, forming part of this specification, Figure 1 is a longitudinal section, on line $x\ x$ of Fig. 2, of two pipes united together by my improved coupling. Fig. 2 is a transverse section of the same on line $y\ y$ of Fig. 1. Fig. 3 is one of the devices employed in making the joint, and Fig. 4 is a lead bar from which the packing-ring is made.

Similar letters of reference indicate corresponding parts.

In the accompanying drawings, A A' are sections of two iron pipes having their ends united by my improved coupling. The first element employed in making this union is a leaden annulus, B, forming the packing of the joint. It is made from a bar such as is represented in Fig. 4. This bar is rolled from sheet-lead, in convenient lengths, and of a width to suit the size of pipe to which it is to be applied. In rolling it the longitudinal bead $a$ is formed on one side, and a corresponding groove, $b$, on the other, and when preparing the packing for the joint, pieces are cut from the bar of a length equal to the exterior circumference of the pipe. It is then bent into a circle or ring on a mandrel, or in any other convenient way, and the two ends soldered together with a blow-pipe.

B' B'' are two iron rings of a greater diameter than the pipes A A', their least internal diameter being equal to that of the pipes plus that of the packing-ring B in its flat portions. The internal surface of the rings B' B'' is chamfered from the edges inward at different angles, the more acute being outside when the joint is made, thus giving it a doubly-beveled contour, as clearly shown in Fig. 1 at $c\ c'$. The hoop encircling the whole coupling is indicated by the letter C. It is a plain iron ring of a diameter equal to the external diameter of the rings B' B'', and about one-third the width of both of these.

The manner of forming a union between the pipes is as follows: One of the pipes—say A—is placed in its bed, and the hoop C and ring B' are slipped on it, out of the way of the joint. The packing-ring B is then taken and slipped on the pipe A so that the bead $a$ will bear against the end thereof, and then pipe A' is placed on its bed, the ring B'' slipped over it, and it is drawn up and inserted in the packing-ring, with its end against the opposite side of the bead, as shown in Fig. 1. The flat portion of the ring, bearing on the outside of the two pipes, is then made to hug them and form a tight joint by condensing it with light blows from a hammer, or by compressing it with suitable pinchers. Two flat semicircular pieces of metal, D, are then placed in the groove $b$, on opposite sides, so that the two arms $c''\ c''$ of one will join the two arms of the other at the diameter, where they are secured by hooks inserted through the holes $d$ in the adjoining arms.

The internal diameter of the ring formed by the union of the two semicircular pieces D should be the same as the diameter of the groove $b$, while its full diameter should be about the same as that of the rings B' B''. When placed in the grooves and secured, the rings B' B'' are drawn up on each pipe, where they have been resting, and are pushed up over the exterior of the packing-ring until they bear against opposite sides of the projecting flange of the ring inserted in the groove $b$. The portion of the lead packing-ring between the pipes and the two rings B' B'' is then worked with a punch until it is condensed and compressed into the space until the peripheries of its two parts conform to the oppositely-beveled surfaces of the rings B′ B″, so that two wedge-like surfaces will be formed, that will hold the rings B′ B″ in place, so that they cannot move in either direction, and the packing itself cannot move, as the bead between the pipes prevents it. The semicircular pieces D are then removed from the groove, and the hoop C moved up over the rings B′ B″ and placed midway over them, so as to cover the groove $b$, which is enlarged to the extent of the diameter of the rings B′ B″, as clearly shown in Fig. 1. The space between the pipes and the rings B′ B″, outside of the packing-ring B, on each side, is then filled with any suitable cement, as indicated by the letter $d'$ at these places.

A coupling formed in this way enables straight pipes without sockets to be used, and makes a perfect union between the pipes, as strong and tight as may be desired, but sufficiently flexible to yield to the expansion and contraction of the pipes. At the same time it is more easily made than the ordinary socket-union, as all the parts can be made ready for use, and can be put together in a short time. So, too, the union is a permanent one, and will not be destroyed by change of temperature or the vibrations of the ground causing the pipes to work loose, as the groove in the packing-ring and between the rings B′ B″ furnishes space for the pipes to expand, or for any movement caused by vibrations of the ground, and the elasticity of the metal will cause it to resume its place so soon as the pipe returns to its normal condition.

Having thus described my invention, I claim as new and desire to secure by Letters Patent—

1. As an improvement in joints and couplings, the packing-ring B, provided with a bead, $a$, and groove $b$, in combination with pipes A A′, metal rings B′ B″, and exterior hoop, C, applied to form a union between the said pipes, in the manner substantially as described.

2. As an improvement in joints and couplings, the metal semicircles D, applied to the joint so as to rest in the groove $b$, and used to retain the groove while the lead packing-ring is being compressed and condensed between the rings and the pipes, substantially as described.

ALPHONSE BODART.

Witnesses:
JNO. WILSON,
G. STOCKWELL.